(12) United States Patent
Teng et al.

(10) Patent No.: US 8,144,472 B2
(45) Date of Patent: Mar. 27, 2012

(54) CONDUCTIVE WIRE PATTERN AND METHOD OF MONITORING THE BONDING ERROR OF A FILM

(75) Inventors: Yin-Hsiang Teng, Taoyuan County (TW); Han-Tung Hsu, Tao-Yuan Hsien (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 427 days.

(21) Appl. No.: 12/430,905

(22) Filed: Apr. 28, 2009

(65) Prior Publication Data

US 2010/0157557 A1 Jun. 24, 2010

(30) Foreign Application Priority Data

Dec. 18, 2008 (TW) ................................ 97149371 A

(51) Int. Cl.
*H05K 1/00* (2006.01)
(52) U.S. Cl. ...................................................... 361/749
(58) Field of Classification Search .................. 361/749; 439/67; 349/149, 150; 356/620
See application file for complete search history.

(56) References Cited

U.S. PATENT DOCUMENTS

| | | | | | |
|---|---|---|---|---|---|
| 4,690,472 | A | * | 9/1987 | Elco et al. | 439/67 |
| 4,713,014 | A | * | 12/1987 | Conroy-Wass | 439/67 |
| 4,742,431 | A | * | 5/1988 | Igarashi | 361/749 |
| 4,799,129 | A | * | 1/1989 | Izumino | 361/827 |
| 4,950,527 | A | * | 8/1990 | Yamada | 428/192 |
| 5,053,357 | A | * | 10/1991 | Lin et al. | 29/593 |
| 5,192,214 | A | * | 3/1993 | Samarov et al. | 439/67 |
| 5,258,866 | A | * | 11/1993 | Ishikawa et al. | 349/150 |
| 5,358,412 | A | * | 10/1994 | Maurinus et al. | 439/66 |
| 5,418,691 | A | * | 5/1995 | Tokura | 361/803 |
| 5,951,304 | A | * | 9/1999 | Wildes et al. | 439/67 |
| 6,045,368 | A | * | 4/2000 | Cadenhead et al. | 439/67 |
| 6,050,830 | A | * | 4/2000 | Tanaka | 439/67 |
| 6,444,923 | B1 | * | 9/2002 | Iriguchi et al. | 174/261 |
| 6,577,370 | B1 | * | 6/2003 | Sato | 349/149 |
| 6,872,081 | B2 | * | 3/2005 | Imaoka | 439/65 |
| 6,909,488 | B2 | * | 6/2005 | Kurasawa | 349/187 |
| 7,193,158 | B2 | * | 3/2007 | Yoshida | 174/260 |
| 7,204,698 | B2 | * | 4/2007 | Chang et al. | 439/67 |
| 7,211,736 | B2 | * | 5/2007 | Lassar et al. | 174/254 |
| 7,349,055 | B2 | * | 3/2008 | Lee et al. | 349/152 |
| 7,419,380 | B2 | * | 9/2008 | Yamada | 439/65 |

(Continued)

FOREIGN PATENT DOCUMENTS

TW 444310 7/2001

*Primary Examiner* — Neil Abrams
(74) *Attorney, Agent, or Firm* — Winston Hsu; Scott Margo

(57) ABSTRACT

A conductive line pattern of a pad area includes a plurality of terminals arranged side by side. Each terminal includes an opening portion that surrounds a bonding pad of the substrate and with a side edge and a line portion connecting with the side edge of the corresponding opening portion. The relative position of each line portion and the corresponding opening portion varies according to the location of the terminal in the pad area. A pattern of conductors (74) on a film (72) is to be bonded to the bonding pads at the openings (64) and the line portions (66) positional correspondence to the conductors (74) is used to detect alignment error. If any of the line (66) are located in the middle of a conductor (74) it serves to indicate an improper shift of the film (72).

7 Claims, 12 Drawing Sheets

U.S. PATENT DOCUMENTS

| | | | |
|---|---|---|---|
| 7,546,464 B2* | 6/2009 | Hayashi et al. | 713/176 |
| 7,728,945 B2* | 6/2010 | Liu et al. | 349/149 |
| 7,740,486 B2* | 6/2010 | Watanabe | 439/55 |
| 7,751,016 B2* | 7/2010 | Abe et al. | 349/150 |
| 7,835,159 B2* | 11/2010 | Mishiro et al. | 361/784 |
| 7,965,366 B2* | 6/2011 | Shie | 349/150 |
| 2009/0323503 A1* | 12/2009 | Nomura et al. | 369/112.23 |
| 2010/0202119 A1* | 8/2010 | Nagami et al. | 361/749 |

* cited by examiner

CONDUCTIVE WIRE PATTERN AND METHOD OF MONITORING THE BONDING ERROR OF A FILM

BACKGROUND OF THE INVENTION

1. Field of the Invention

The present invention is related to a conductive wire pattern of a pad area and a method of monitoring a bonding error of a film, and more particularly, to a conductive wire pattern of a pad area that can serve as a reference basis of monitoring a bonding error of a film and the method of monitoring the bonding error thereof.

2. Description of the Prior Art

An array substrate and a color filter (CF) substrate are separately fabricated in the general fabrication of a liquid crystal display (LCD). The fabrication of the array substrate includes several steps of semiconductor process such as thin film deposition, photolithography, and etching processes in order to fabricate thin film transistor (TFT) array. The CF substrate includes color filters corresponding to the TFTs or pixels in an array arrangement on a substrate. After the fabrication of the array substrate and the CF substrate are completed, attachment of the two substrates would been taken place followed by a breaking or segmenting process.

Please refer to FIG. 1. FIG. 1 is a schematic diagram of a conventional LCD panel 10. The conventional LCD panel 10 includes a CF substrate 12 and an array substrate 14, wherein the CF substrate 12 is smaller in size than the array substrate 14. Thus, part of the array substrate 14 would be exposed by the CF substrate 12. The exposed array substrate 14 by the CF substrate 12 is usually determined as the non-display region 16. A plurality of terminals are disposed within the non-display region 16, so as to electrically connect the wires of the internal wires of the LCD panel 10 such as scan lines or signal lines to an external control circuit. Please refer to FIG. 2. FIG. 2 is a schematic diagram of a part of a terminal 20 of the LCD panel 10 of FIG. 1. In general, the terminal 20 includes an opening portion 22 and a line portion 24, wherein the main function of the opening portion 22 is to transfer external control signals to the internal wires of the LCD panel 10. Thus, when the fabrication of the LCD panel 10 is completed, films such as printing wire board (PWB) films are usually bonded to the non-display region 16, and the conductive wire pattern on the films is electrically connected to the opening portion 22 for transferring the external signals. As shown in FIG. 3, when the film (not shown) is bonded to the non-display region 16, the conductive pattern 26 on the surface of the film is supposed to cover the center portion of the terminal 20, thus enabling the distances d1 and d2 between the conductive pattern 26 and the both sides of the opening portion 22 to be equal.

However, in the process of bonding/attaching the film, there are possibilities that mismatch on the machine or tool lead to errors of the bonding location. As shown in FIG. 4, since a bonding error (or so called attaching aberration) of a film occurred, the conductive pattern 26 on the film is displaced to near the right side of the terminal 20, such that the distance d1, the distance between the conductive pattern 26 and the left side of the opening portion 22, is larger than the distance d2, the distance between the conductive pattern 26 and the right side of the opening portion 22. From the above, it is concluded that there are inevitable bonding error in the conventional film bonding technology; it is therefore the bonding error of attaching a film must be monitored. The conventional method of testing the bonding error of a film can be classified into three types, one of which is utilizing sensors including charge coupled device (CCD) for carrying out the test. The detector must utilize a CCD sensor to search for the non-display region 16 and make sure if bonding error of a film occurred. If a bonding error is determined, the shifted length of the film is then calculated by the scale ruler of the CCD sensor. However, the shortcomings of this kind of test include that the LCD panel 10 has to be especially delivered to the machine with the sensor so as to carry out the test. Besides, the detector has to use the CCD sensor to search for the location of the targets of the test with consuming much time and there are possibilities that no errors be detected. In addition, there are requirements of the standards of the sensor, for instance, the sensor needs to scales of measurement and the built-in measuring programs. Furthermore, the accuracy of the test is questionable.

In the second type of conventional method of testing the bonding error of a film, a detector will directly use measuring tools to detect the bonding error between the terminals 20 and the conductive pattern 26 after bonding the film. Bonding error of a film and the shifted distance to the left or to the right may be determined through measuring the distance d1 and the distance d2, where the distance d1 represents the distance between the conductive pattern 26 and the left side of the opening portion 22, and the distance d2 is the distance between the conductive pattern 26 and the right side of the opening portion 22. However, the shortcomings of this measure method include troublesome testing procedures and lack of accuracy.

In another aspect, the third conventional method of testing the bonding error of a film is utilizing the shifting measuring mark to measure the distance of the error of the film. First, a shifting measuring mark 30 is formed by exposure on the array substrate 14. As shown in FIG. 5, the shifting measuring mark 30 includes three sub-marks 30a, 30b, 30c, which are triangles with vertex angle facing the top. A shifting measuring mark 32 in the form of an up-side-down triangle is formed on the film, too. When the film is bonded to the terminals 20 without error (as the relative position of the terminals 20 and the conductive pattern 26 on the left of FIG. 5), the vertex angle of the up-side-down triangle in the bottom of the shifting measuring mark 32 on the film will meet the mid-point of the shifting measuring mark 30, the vertex angle of the sub-mark 30b in the middle of the shifting measuring mark 30. Please refer to FIG. 6. FIG. 6 illustrates the condition when bonding error of a film occurs. As shown on the left of FIG. 6, the bonded film shifted to the right for a certain length, the vertex angle of the shifting measuring mark 32 happens to meet the vertex angle of the sub-mark 30c of the shifting measuring mark 30. It is therefore determined that the film is shifted to the right for 3 micrometers (um). However, there are still shortcomings of the third measure method: due to the imaging limitation of the exposure machine, patterns smaller than 3 um may not be formed. The sharp points of the vertexes of the triangle patterns may not be perfectly formed as well, and a rounded pattern may be obtained. Thus accuracy of the measurement of the shifted length would be influenced.

Therefore, the method on how to determine if a bonding error of a film occurred and how to measure the bonding error of a film in an easy and efficient way remains as important issues in the LCD panel industry.

SUMMARY OF THE INVENTION

One objective of the present invention is to provide a special conductive line pattern of a pad area and a method of utilizing the conductive wire pattern to monitor a bonding error of a film, so that the efficiency and the accuracy of detecting bonding error of a film is increased. The problem of the conventional method of detecting the bonding error of a film includes time consuming with the troublesome procedures, causing low efficiency and not being able to control the accuracy is thus solved.

According to the present claims, a conductive line pattern of a pad area is provided. The conductive line pattern of a pad area includes a plurality of terminals arranged side by side and along a first direction in the pad area, each of the terminals comprising: an opening portion with at least a side edge of the opening portion; and a line portion connecting with the side edge; wherein a relative position of each of the line portion and each of the corresponding opening portion varies according to a location of the terminal in the pad area.

According to the present claims, a method of monitoring the bonding error of a film is further provided. The method of monitoring the bonding error of a film includes providing a film having a plurality of conductive patterns thereon; and providing a target area with a surface for bonding the film, wherein the target area comprises a plurality of base marks and a plurality of aberration marks, and each of the base marks corresponds to one of the conductive patterns, the base marks are arranged along a first direction and side by side in the target area. Each of the aberration marks connects to one of the base marks, wherein the relative position between each of the aberration marks and the corresponding base mark differs in accordance with the location of the base mark in the target area. The method of monitoring the bonding error of a film includes further includes bonding the film onto the target area, and observing the relative position between the conductive pattern and the aberration marks and the location of the base marks in the target area corresponding to the conductive patterns to determine if a bonding error of the film occurs.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
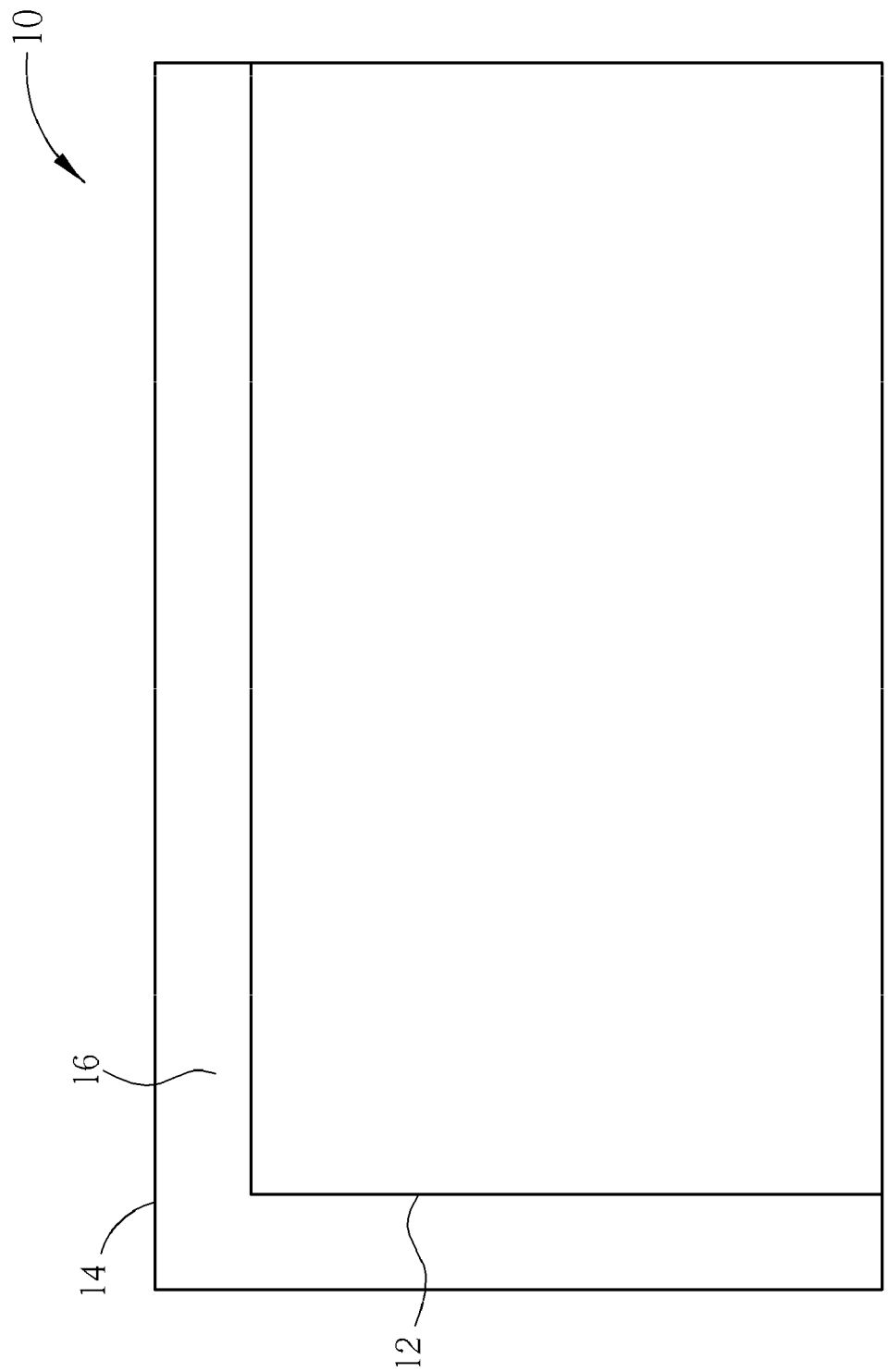
FIG. 1 is a schematic diagram of a conventional LCD.
Figure 2:
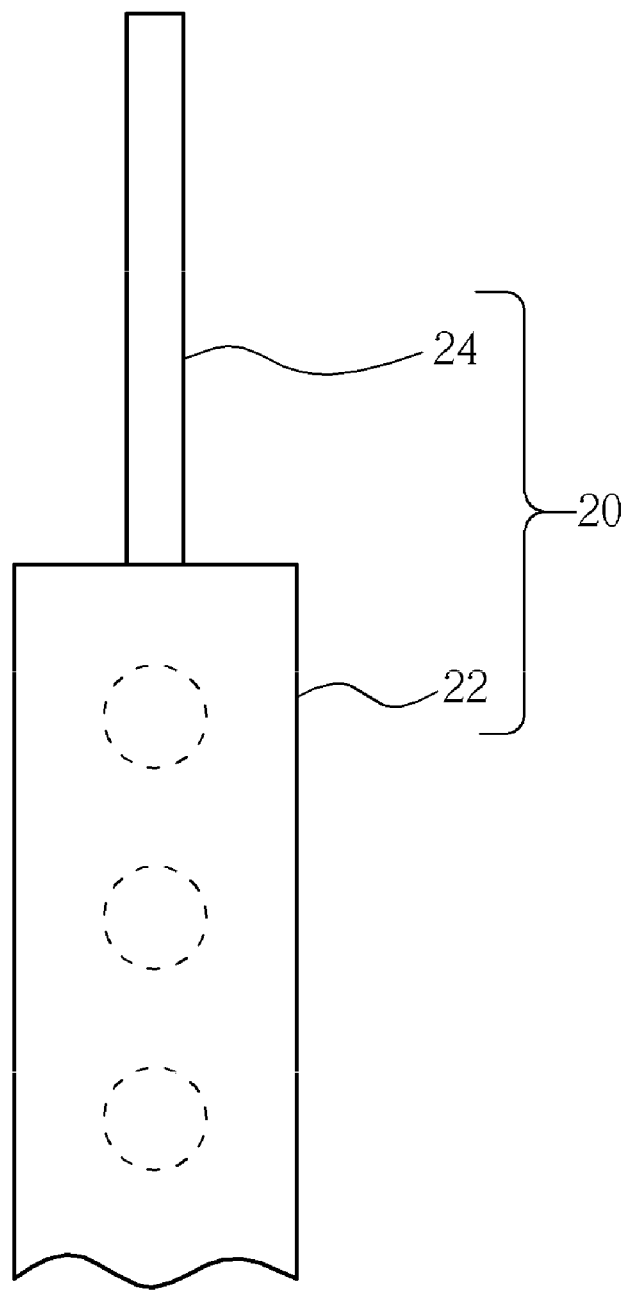
FIG. 2 is a schematic diagram of a part of a terminal of the LCD panel of FIG. 1.
Figure 3:
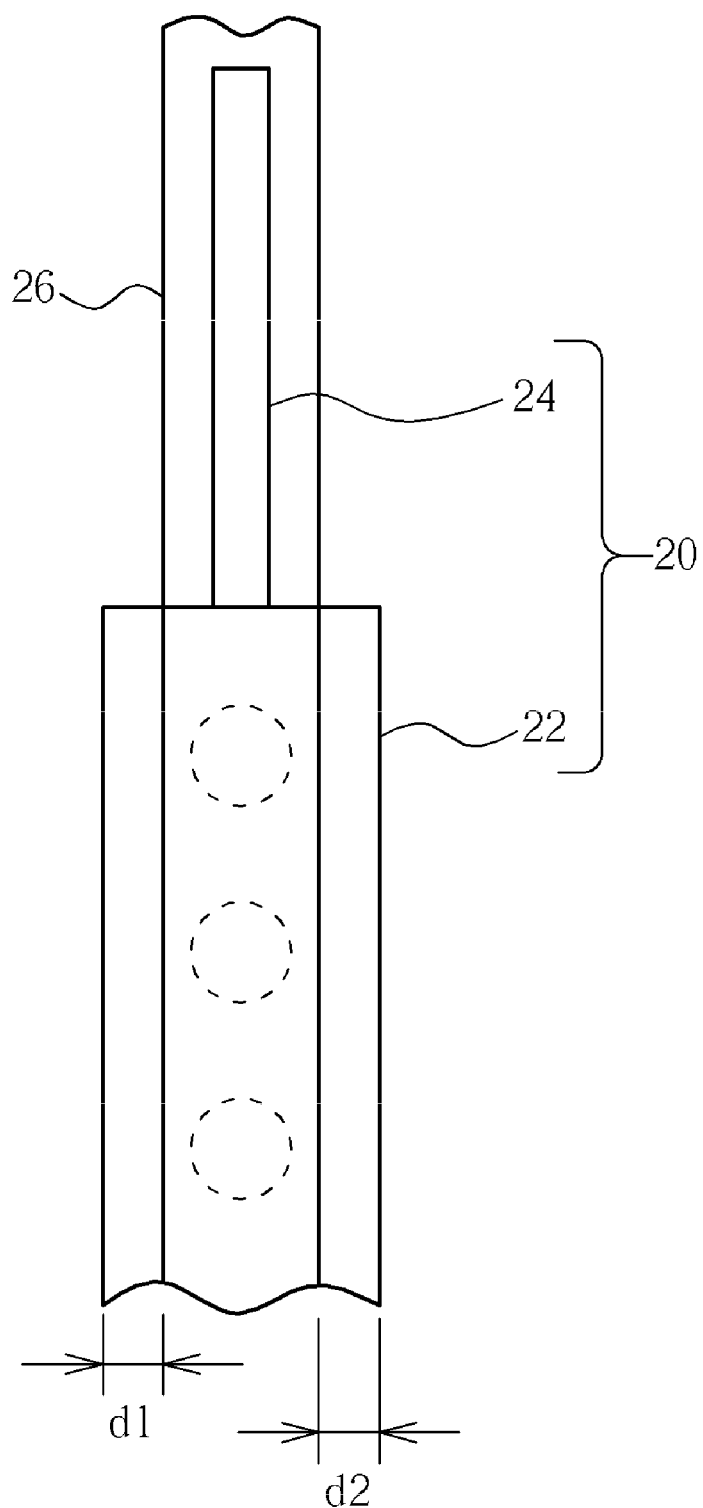
FIG. 3 is a schematic diagram of bonding a film to the terminal of FIG. 2.
Figure 4:
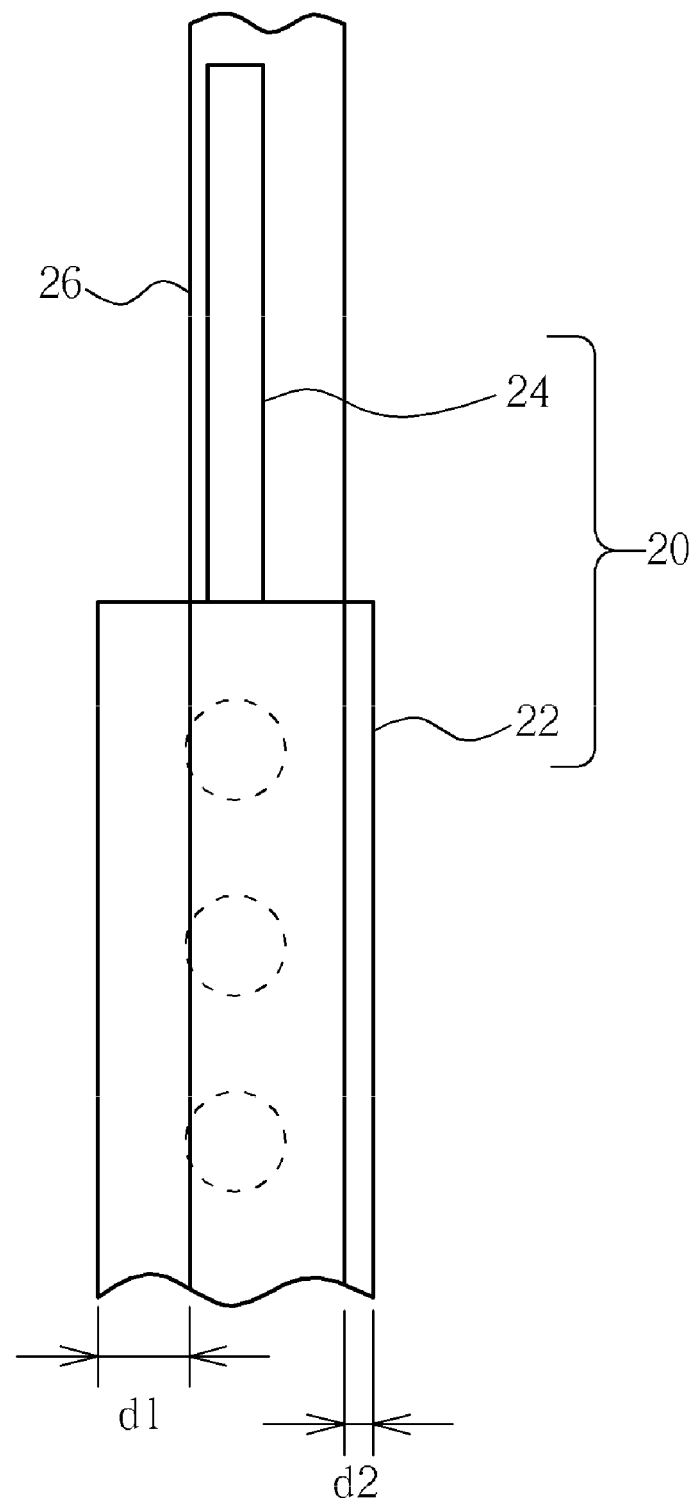
FIG. 4 is a schematic diagram of a film with a bonding error.
Figure 5:
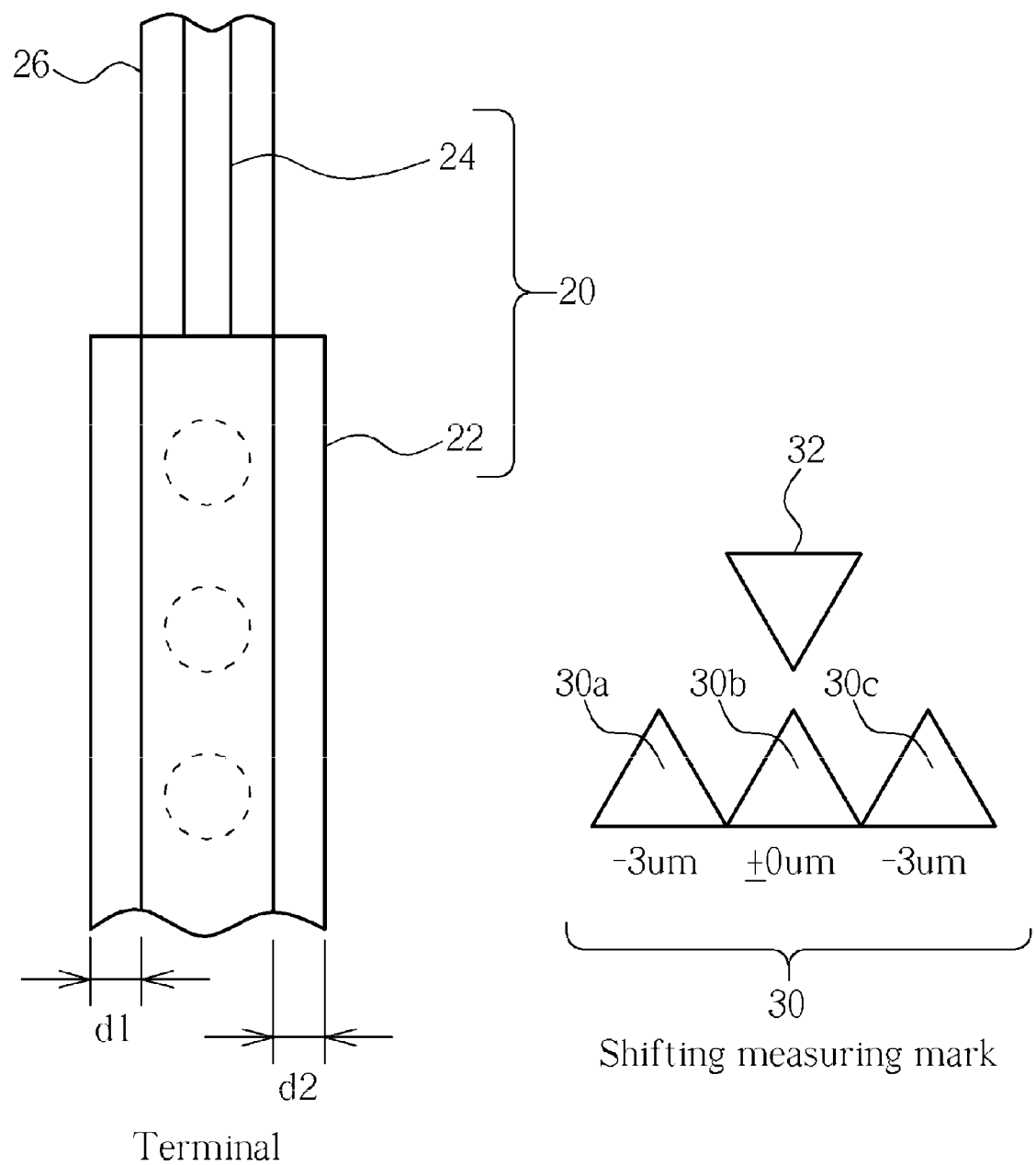
FIG. 5 and FIG. 6 are schematic diagrams of the conventional method of monitoring a bonding error of a film utilizing a shifting measuring mark.
Figure 6:
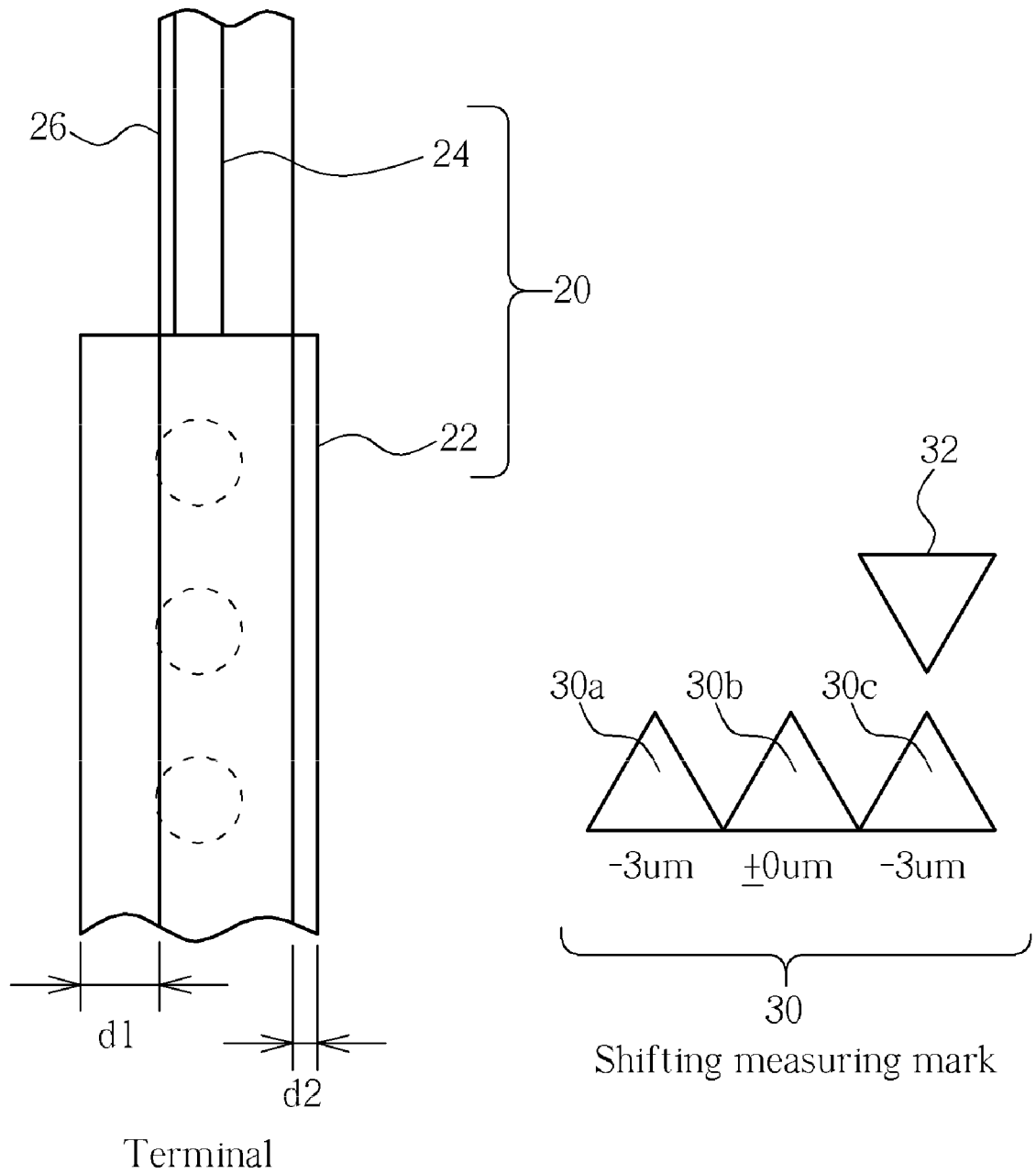
Figure 7:
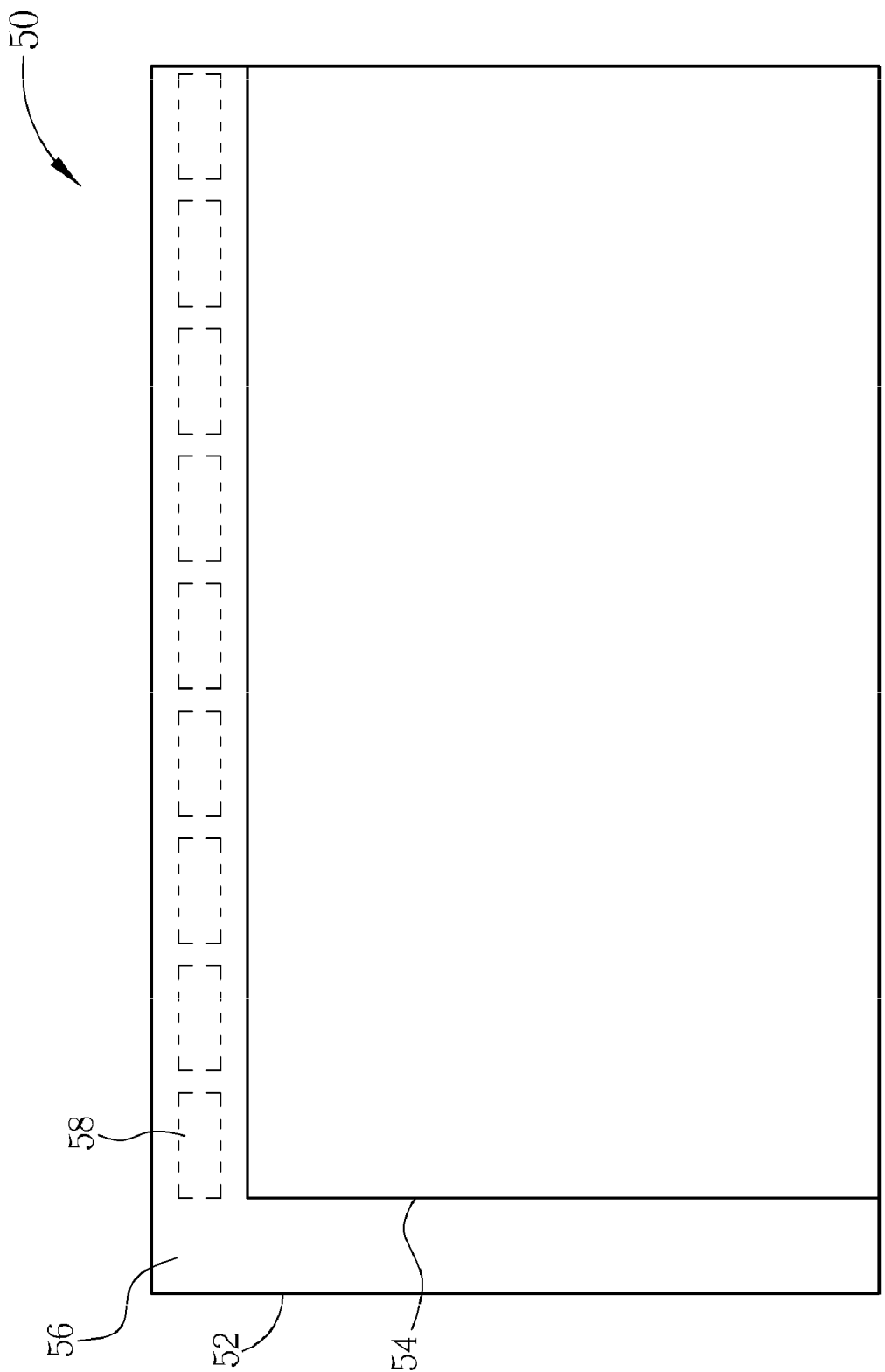
FIG. 7 is a schematic diagram of a conductive wire pattern in application of an LCD panel of the present invention.

Please refer to FIG. 7. FIG. 7 is a schematic diagram of a conductive wire pattern in application of an LCD panel of the present invention. An LCD panel 50 includes an array substrate 52 and a CF substrate 54. The region of the array substrate 52 that is not covered by the CF substrate 54 is defined as a non-display region 56. A plurality of pad areas 58 are disposed in the non-display region 56 (only the pad areas of the signal lines are shown in FIG. 7), for disposing terminals so as to electrically connect to the outer circuit and drive the LCD panel 50.

Figure 8:
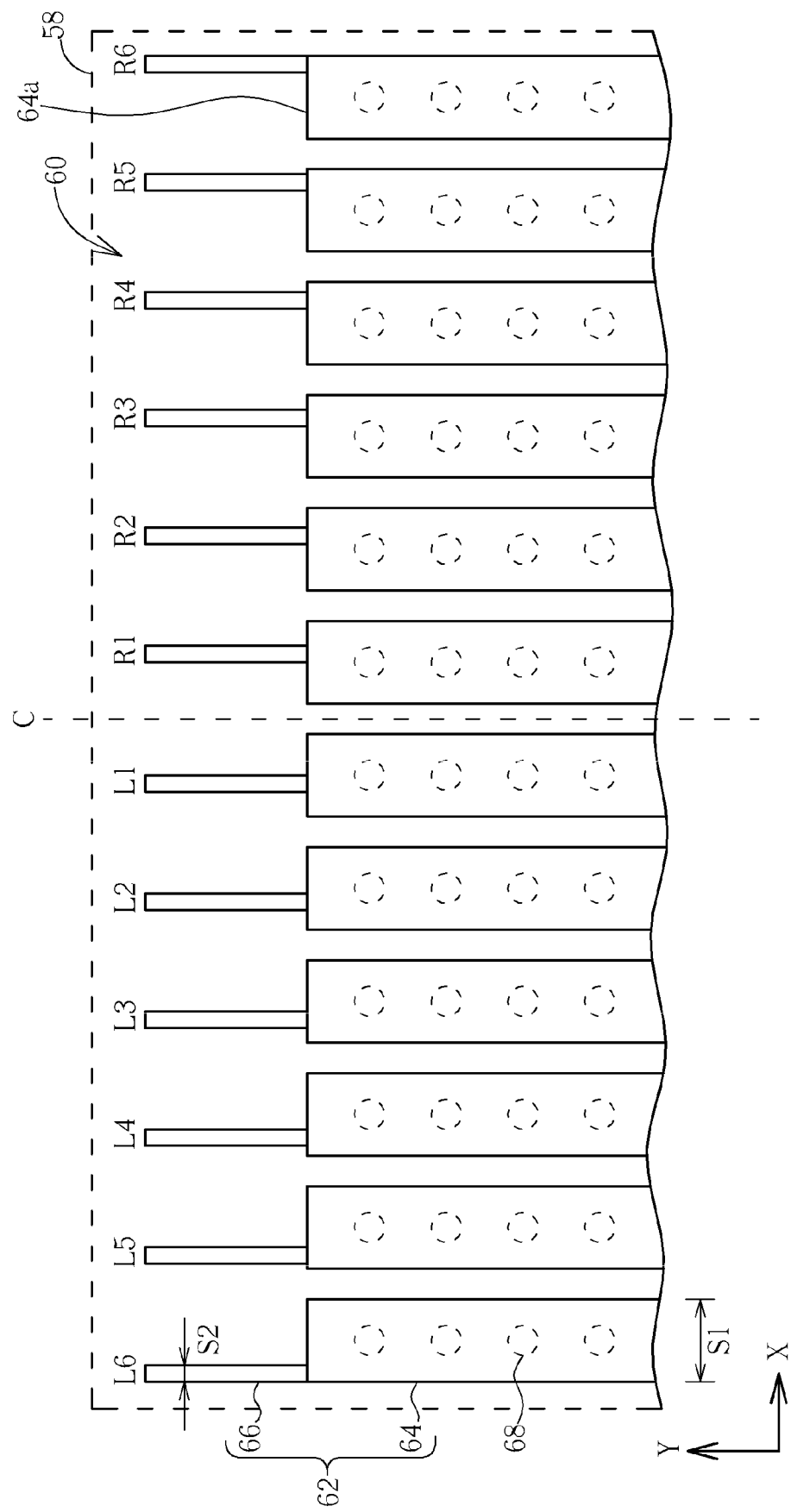
FIG. 8 is an amplified schematic diagram of the conductive wire pattern in a pad area of the LCD panel of FIG. 7.

Please refer to FIG. 8. FIG. 8 is an amplified schematic diagram of the conductive wire pattern in a pad area 58 of the LCD panel of FIG. 7. The conductive wire pattern 60 includes a plurality of terminals 62 that are parallel to each other along the Y direction and arranged side by side along the X direction in FIG. 8. Each of the terminals 62 includes an opening portion 64 and a line portion 66. The opening portions 64 are used for electrically connecting to the conductive pattern of the film that would be later on bonded to the surface of the array substrate 52, and the opening portions 64 may be utilized to transmit signals. The line portions 66 provide a function of location recognition during the rim grinding process of the LCD panel 50. In addition, the line portions 66 may electrically connect to a static electricity eliminating apparatus (electrostatic discharge device), such as a short ring, before the rim grinding process to avoid damage caused by static electricity. Therefore, conductive materials such as metal materials are the preferred materials for the terminals 62 including the opening portions 64 and line portions 66. There are pluralities of contact hole structures 68 in the opening portions 64, which is utilized to electrically connect different material layers on the array substrate 52. In addition, each of the opening portions 64 has a same width S1, and each of the line portions 66 also has a same width S2. Each of the opening portions 64 includes a side edge 64a of the opening portion, and each of the line portions 66 is connected to the side edge 64a of the corresponding opening portion 64. However, the relative position of each of the line portions 66 and the corresponding opening portion 64 varies in accordance with the location of the terminals 62 in the pad area 58 in the present invention.

For further illustrations of the variation of the relative position between the terminals 62 and the opening portion 64, different numerals are used to represent the line portions 66 that locate in different areas of the pad area 58. A base line C is defined to be parallel in the Y direction in the pad area 58, wherein the base line C is preferred to be the center line of the pad area 58. The line portions 66 of the terminals 62 locating at the left of the base line C are represented by numerals L1, L2, L3, L4, L5 and L6 starting form the base line C to the outer (left) side of the pad area 58 in sequence. The line portions 66 of the terminals 62 locating at the right of the base line C are represented by numerals R1, R2, R3, R4, R5 and R6 starting form the base line C to the outer (right) side of the pad area 58 in sequence. As shown in FIG. 8, with respect to each of the opening portion 64, the line portions R1, R2, R3, R4, R5 and R6 are shifted with one more unit of length to the right starting form the base line C to the outer side of the pad area 58. Similarly, the line portions L1, L2, L3, L4, L5 and L6 are shifted with one more unit of length to the left starting form the base line C to the outer side of the pad area 58 until reaching the left border the opening portion 64.

Figure 9:
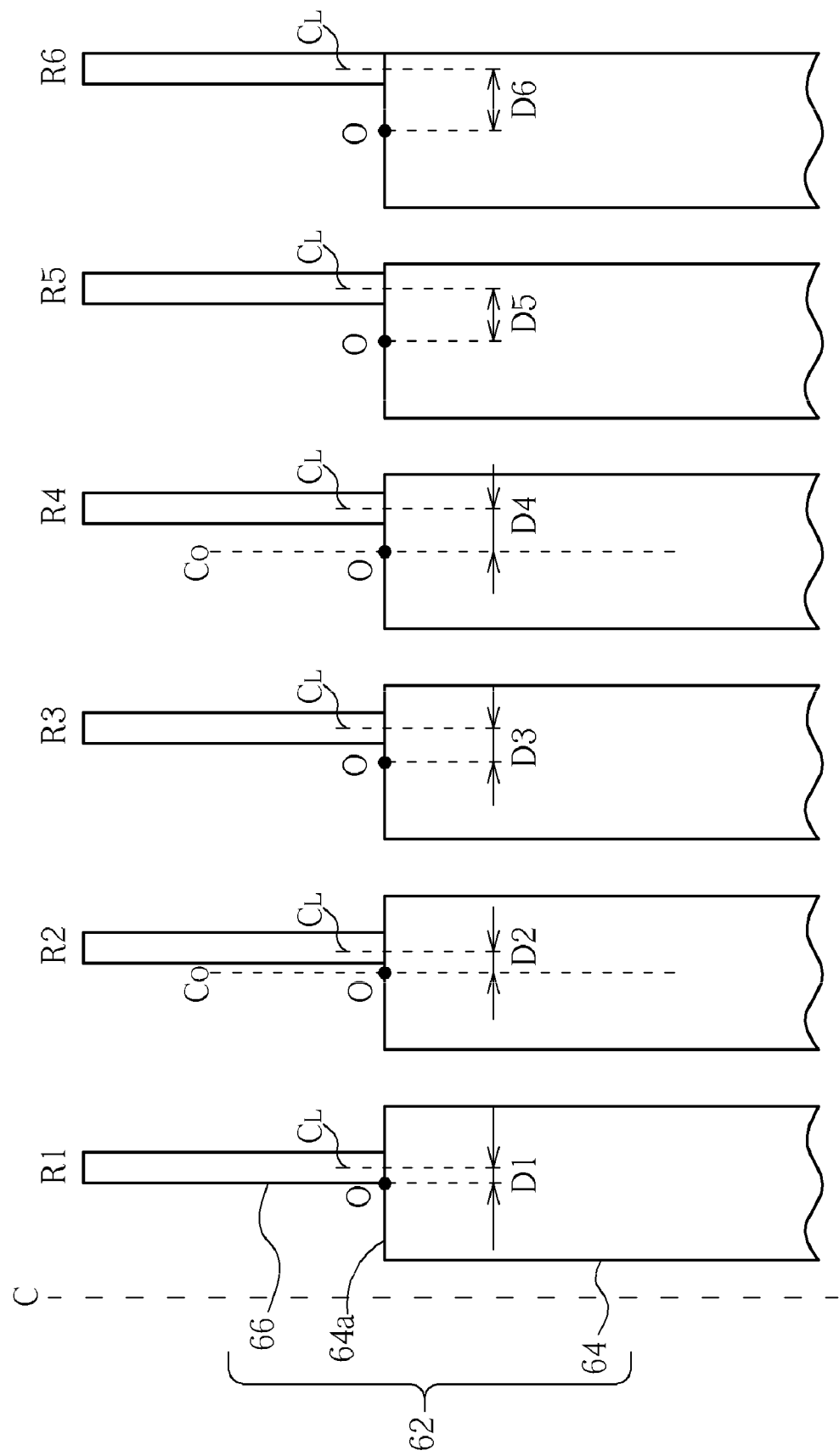
FIG. 9 is an amplified schematic diagram of a portion of the pad area of FIG. 8.

Please refer to FIG. 9. FIG. 9 is an amplified schematic diagram of a portion of the pad area 58 of FIG. 8, wherein only the terminals 62 locating at the right side of the base line C are shown in FIG. 9, and the contact hole structure 68 in FIG. 8 is not drawn. An opening portion center line $C_o$ in parallel to the Y direction of FIG. 8 is defined in each of the opening portions 64 (only the opening portion center line $C_o$ corresponding to line portions R2, R4 are shown in FIG. 9), and the crossing point of the opening portion center line $C_o$ and the corresponding side edge 64a of the opening portion 64 is defined as the midpoint O of each side edge 64a. A line portion center line $C_L$ in parallel to the Y direction in FIG. 8 is further defined within each of the line portions 66. Each of the line portion center lines $C_L$ and the corresponding midpoint O of the side edge 64a have a relative-position difference value D in the line portion 66. The relative-position difference values Dn of the line portions 66 locating at the right of the base line C is different, increasing starting from the base line C to the outer (right) side of the pad area 58, wherein "n" of the above-mentioned "Dn" represents the $n^{th}$ line portion 66 at the right of the base line C. In other words, the relative-position difference values D1, D2, D3, D4, D5 and D6 of the line portions R1, R2, R3, R4, R5 and R6 respectively has the following relationship: D1<D2<D3<D4<D5<D6. If one unit length represents 1 um, the line portion R1 is 1 um shifted to the right when comparing with the midpoint O of the side edge 64a of the opening portion 64, while the line portion R2 is 2 um shifted to the right when comparing with the midpoint O of the side edge 64a, and line portion R3 is 3 um shifted to the right when comparing with the midpoint O of the side edge 64a, until the right side border of the line portion R6 reaches the right side border of the opening portion 64. Similarly, each of the line portions 66 and the corresponding opening portions 64 on the left of the base line C also have a relative-position difference value, increasing starting from the base line C to the outer (left) side, which will not be mentioned in details again. Hence, the line portions 66 in the pad area 58 are symmetrically arranged on both left and right side with respect to the base line C, which serves as a symmetric line. However, in other embodiments, the relative-position difference value between each of the line portions 66 and the corresponding opening portion 64 may be designed to decrease starting from the base line C to the outer side. Therefore, the relative-position difference values of any two adjacent terminals 62 locating at either left or right side of the base line C within the pad area 58 are different.

Figure 10:
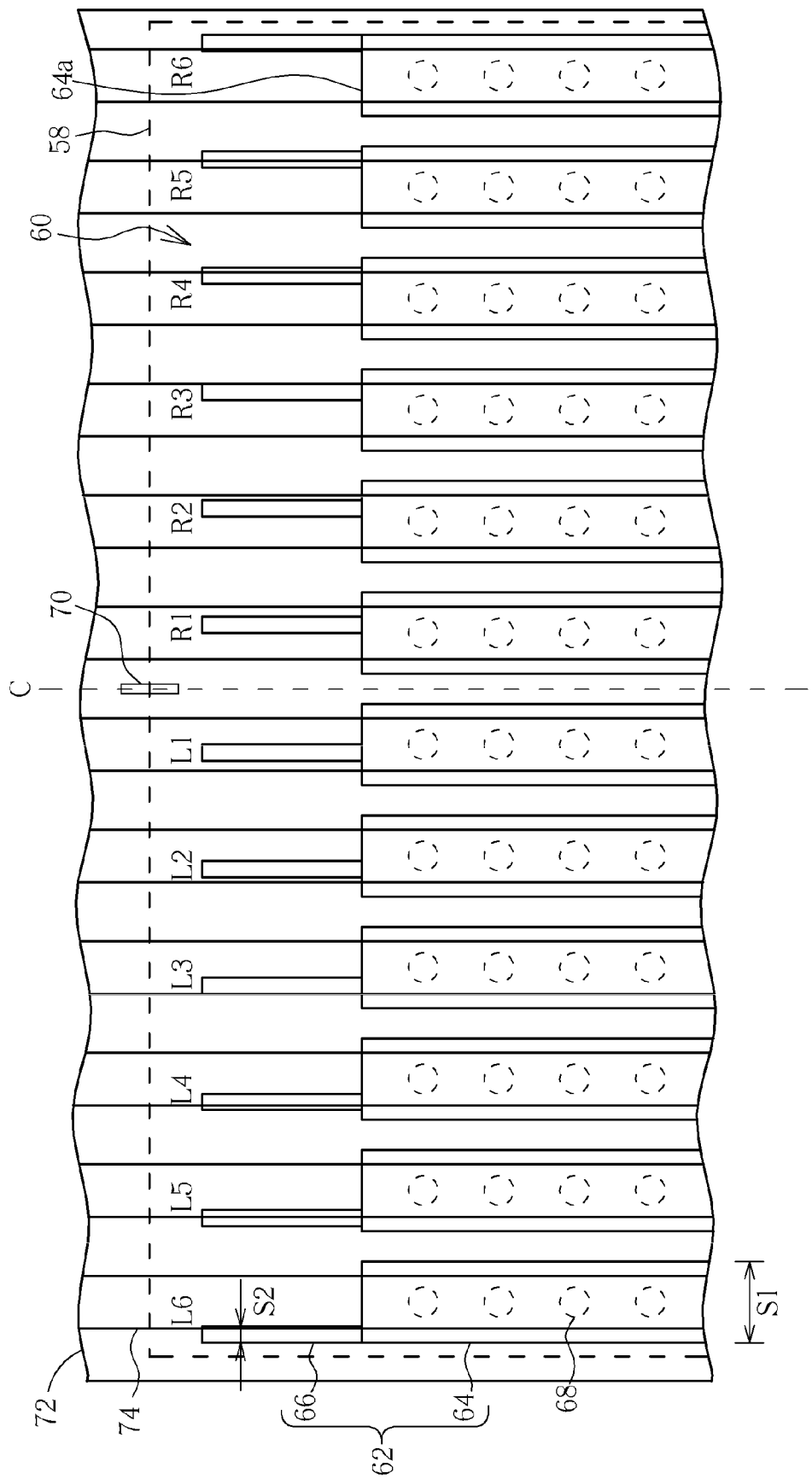
FIG. 10 and FIG. 11 are schematic diagrams of a method of monitoring a bonding error of a film of the present invention.

Please refer to FIG. 10. FIG. 10 is a schematic diagram of a film with conductive pattern bonding onto the pad area without bonding error. As shown in FIG. 10, a film 72 with a plurality of conductive patterns 74 is provided. The film 72 is bonded onto the pad area 58 of FIG. 8, wherein the film 72 may be a PWB with at least a driving IC (not shown) disposed by tape carrier package (TCP). The driving IC may be electrically connected to the terminals 62 via the conductive patterns 74. After bonding the film 72 onto the pad area 58, each of the conductive patterns 74 on the film 72 will correspond to a terminal 62. When no bonding error occurs, each of the line portions 66 will not locate in the middle of the corresponding conductive pattern 74 and will not equally separate the corresponding conductive pattern 74 into two parts. The line portions 66 will locates in one side of the corresponding conductive pattern 74, for instance, the line portion R1 locating at the right side of the base line C will locate to the right side of its corresponding conductive pattern 74. In addition, the line portions 66 that locate at the outer side are shifted more deviated to the center of the conductive patterns 74.

Figure 11:
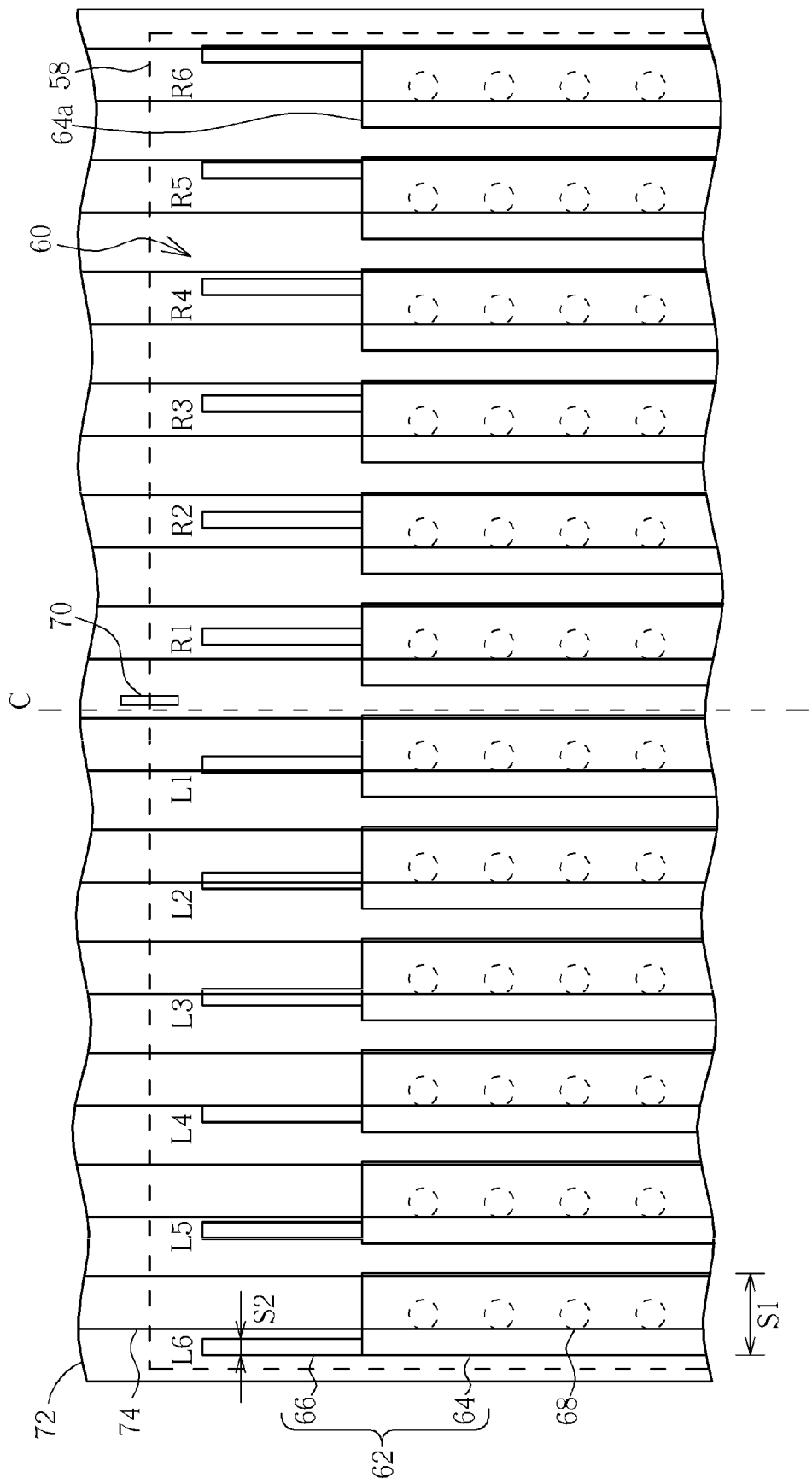

On the other hand, if a bonding error of the film 72 occurs, there would definitely be a line portion 66 that locates near to or just in the middle of the conductive pattern 74. With reference to FIG. 11, FIG. 11 illustrates the situation that the film of FIG. 10 with a bonding error occurs. As shown in FIG. 11, after bonding the film 72, the line portion R2 just locates in the middle of the corresponding conductive pattern 74 and equally separate the conductive pattern 74, which is different from the position in FIG. 10. Thus, a bonding error of the film 72 can be determined. Since the line portion R2 locates in the middle of the corresponding conductive pattern 74, and the line portion R2 is shifted 2 um or 2 units to the right when compared to the opening portion 64, thus it may be concluded that the film 72 is shifted 2 um to the right during the bonding process. In other words, when the detector discovers a line portion Rn or Ln just locates in the middle of the corresponding conductive pattern 74, it can be easily determined that the film 72 has shifted n micrometers or n units to the right or to the left. Moreover, in order for the detector to quickly determine/calculate that the line portion 66 locating in the middle of the conductive pattern 74 is the $n^{th}$ line portion 66 at the left or at the right of the pad area 58, as in finding the n value, the conductive wire pattern 60 in the pad area 58 may further include a base line mark 70 to label the location of the base line C. As a result, the detector may determine the n value with the base line mark 70 and may also define the line portion 66 is at the right side or at the left side of the base line C. As a result, which direction and how many units of length the film 72 has shifted can be easily determined.

Figure 12:
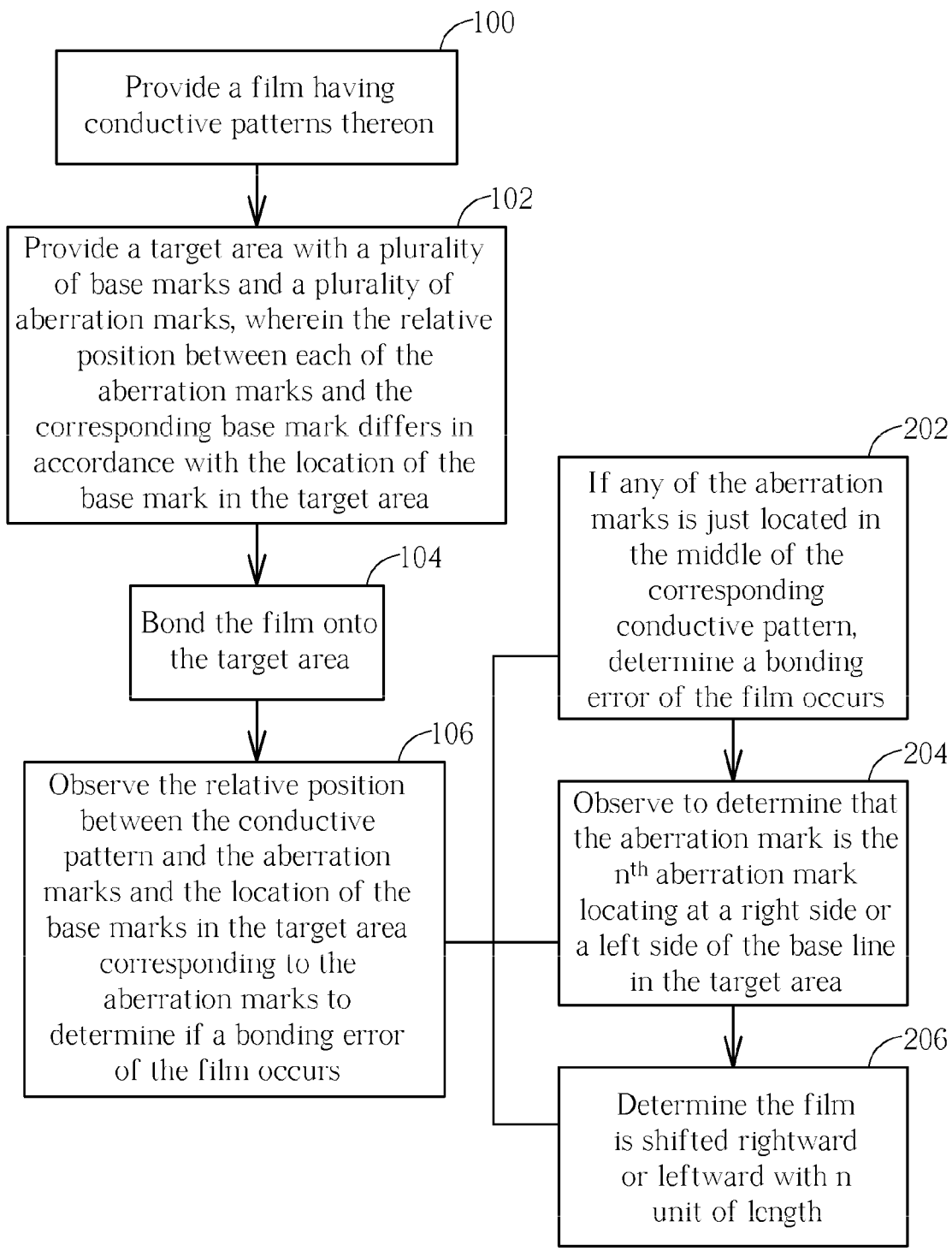
FIG. 12 is a flow chart of the method of monitoring the bonding error of a film of the present invention.

In sum, the special design of conductive wire pattern of a pad area and an effective method of monitoring whether a bonding error of a film occurred and the shifted amount are provided in the present invention. The concept of determining the bonding error is to utilize the opening portions and line portions as base marks and aberration marks, respectively. The relative position of the aberration marks and the base marks varies with the location of the base mark in the pad area. Whether a bonding error of a film occurs may be determined through observing the relative locations of the aberration marks and the bonded conductive pattern. The steps of the method of monitoring a bonding error of a film is shown in FIG. 12 and introduced as follows:

Step 100: Provide a film having conductive patterns thereon;

Step 102: Provide a target area with a surface for bonding the film, in other words, the above mentioned pad area, wherein a plurality of terminals in the pad area are arranged side by side and are parallel to each other. Each of the terminals includes an opening portion serving as a base mark and a line portion serving as aberration marks. Each of the base marks corresponds to an aberration mark, and the relative position between each of the aberration marks and the corresponding base mark differs in accordance with the location of the base mark in the target area;

Step 104: Bond the film onto the target area; and

Step 106: Observe the relative position between the conductive patterns and the aberration marks and the location of the base marks in the target area corresponding to the aberration marks to determine if a bonding error of the film occurs.

In addition, the method of determining if a bonding error of a film occurred mentioned in Step 106 comprises:

Step 202: Observe the relative location between the conductive patterns and the corresponding aberration marks, and if any of the aberration marks (as the line portion R2 shown in FIG. 11) is just located in the middle of the corresponding conductive pattern and equally separates the conductive pattern into two parts, determine a bonding error of the film occurs;

Step 204: Observe the location of the aberration mark mentioned in Step 202 (as the line portion R2 shown in FIG. 11) to determine that the aberration mark is the $n^{th}$ aberration mark locating at the right side or the left side from the center line of the target area or a base line; and Step 206: Determine the film is shifted rightward or leftward with n units of length.

It is learnt from the above that according to the method of monitoring the bonding error film in the present invention, the detector will merely need to observe the pad area with the optical microscope (OM) to determine if bonding error of a film occurs. With the method of monitoring the bonding error of a film in the present invention, it is easily determined whether a bonding error of the film occurs and the shifted length to the left side or the right side. In comparison with the conventional method, there is no requirement of built-in measuring programs or the scales of measurement of sensors such as CCDs; the error determining scale would not be limited due to exposure limitations; a lot of time for searching the possible error and calculating the shifted length are not needed anymore; furthermore, lack of accuracy can be avoided. According to the concept of the present invention, the detector will merely need to observe the relative locations of the terminals and the conductive patterns on the film with the optical microscope to easily and quickly determine the length of the occurred bonding error of the film. In addition, no additional cost is required for forming the conductive wire pattern of the pad area according to the concept of the present invention. By slightly modifying the relative positions of the opening portions and the line portions of the conductive wire pattern, they may serve as the base marks and the aberration marks and be applied to the monitoring method of the present invention. It is to be noted that, the conductive wire pattern design of the pad area and the method of monitoring the bonding error of a film in the present invention is not limited to the conductive wire pattern design of the LCD panel or monitor the bonding error of a film in LCD panel fabrication, it may also be applied to other conditions with overlaying patterns that require monitoring or determining overlaying errors or shift errors.

Those skilled in the art will readily observe that numerous modifications and alterations of the device and method may be made while retaining the teachings of the invention.

What is claimed is:

1. A conductive line pattern of a pad area, comprising a plurality of terminals arranged side by side and along a first direction in the pad area, each of the terminals comprising:
   an opening portion with at least a side edge of the opening portion; and
   one exclusive line portion connecting with the side edge;
   wherein a relative position of each of the line portions and the corresponding opening portion varies according to a location of the terminal in the pad area, the pad area comprises a base line in parallel to the first direction, each of the line portions comprises a center line in parallel to the first direction, the center line of each of the line portions and a midpoint of the side edge of the corresponding opening portion has a relative-position difference value, and the relative-position difference values of any two of the adjacent terminals locating on a side of the base line in the pad area are different and the relative-position difference values increase or decrease progressively from the base line to an outer side of the pad area.

2. The conductive line pattern of claim 1, wherein the base line is a center line of the pad area.

3. The conductive line pattern of claim 2, wherein the center line serves as a symmetric line for the line portions, and the line portions at two sides of the center line are symmetrically arranged with respect to the center line.

4. The conductive line pattern of claim 1, further comprising a base line mark pointing out the location of the base line in the pad area.

5. The conductive line pattern of claim 1, wherein the conductive line pattern is disposed on a substrate.

6. The conductive line pattern of claim 5, wherein the substrate is an array substrate of a display panel.

7. The conductive line pattern of claim 1, wherein the terminals comprises metal materials.

* * * * *